United States Patent [19]

Nagano

[11] Patent Number: 5,136,402

[45] Date of Patent: Aug. 4, 1992

[54] READ-OUT APPARATUS FOR SOLID STATE IMAGING DEVICE AND IMAGE SCANNER USING THE SAME

[75] Inventor: Fumikazu Nagano, Yamato-Koriyama, Japan

[73] Assignee: Sharp Kabushiki Kaisha, Osaka, Japan

[21] Appl. No.: 660,377

[22] Filed: Feb. 25, 1991

[30] Foreign Application Priority Data

Feb. 28, 1990 [JP] Japan .................................. 2-47403

[51] Int. Cl.$^5$ .............................................. H04N 3/14
[52] U.S. Cl. ............................... 358/483; 358/213.22
[58] Field of Search ................... 358/213.13, 213.22, 358/213.26, 482, 483

[56] References Cited

U.S. PATENT DOCUMENTS

| | | | |
|---|---|---|---|
| 4,703,365 | 10/1987 | Mumford | 358/483 |
| 4,743,971 | 5/1988 | Hügli | 358/213.26 |
| 4,858,020 | 8/1989 | Homma | 358/213.26 |
| 4,910,599 | 3/1990 | Hashimoto | 358/213.26 |

FOREIGN PATENT DOCUMENTS

1311775 12/1989 Japan .

Primary Examiner—Stephen Brinich
Attorney, Agent, or Firm—David G. Conlin; Robert F. O'Connell

[57] ABSTRACT

A read-out apparatus for a solid state imaging device having a plurality of photoelectric converter elements which convert image into photoelectric charges and store the photoelectric charges, respectively. The apparatus includes a shift register for shifting charges, transferred from the photoelectric converter elements, in sequence to output image signals which correspond to the photoelectric converter elements, respectively, a gate for transferring the charge stored in the respective photoelectric converter elements to the shift register each time a transfer signal is applied thereto, and a transfer signal generation unit for generating the transfer signal when an image signal corresponding to a predetermined one of the photoelectric converter elements is outputted so that charges in the shift register transferred from the photoelectric converter elements are partially overlapped with charges transferred in previous transfer operation.

23 Claims, 7 Drawing Sheets

READ-OUT APPARATUS FOR SOLID STATE IMAGING DEVICE AND IMAGE SCANNER USING THE SAME

BACKGROUND OF THE INVENTION

1. Field of the Invention

The present invention relates to a read-out apparatus of a solid state imaging device and an image scanner using the read-out apparatus.

2. Description of the Related Art

A CCD (Charge Coupled Device), which is an example of solid state imaging devices used for image scanners, is provided with a large number of sensor elements for converting light to electricity (named photoelectric conversion) and for storing photoelectric charges obtained by the photoelectric conversion and an analog shift register for transferring the charges stored in the sensor elements and for successively outputting a voltage signal. The voltage signal outputted from the analog shift register is sampled and then converted into a digital signal.

By using a CCD linear image sensor, in which sensor elements are disposed in line, when an original in the letter size (8.5 inch width) is picked-up with a resolution of 400 DPI (Dot Per Inch), the number of sensor elements, namely the number of photoelectric converter elements, is 8.5 inches×400 elements/inch=3400 elements. However, the number of elements of CCD linear image sensors which are currently available and which meet applicable standards is one of 1024, 2048, 2592, and 5000. Thus, to satisfy 3400 elements, it is necessary to use a CCD linear image sensor with 5000 elements.

A conventional read-out apparatus is designed to scan all the photoelectric converter elements of the CCD image sensor at a particular speed. Thus, if image information inputted to the CCD linear image sensor with 5000 elements is read out with the conventional read-out apparatus, the photoelectric converter elements which are not used for picking-up the image are also scanned and thereby the unnecessary read-out time is required. In other words, in case that image of an original which can be satisfactorily picked-up by a CCD sensor with 3400 elements is picked-up by a CCD sensor with 5000 elements, 1600 elements are excessively read out causing the read-out time to unnecessarily increase.

SUMMARY OF THE INVENTION

Therefore, an object of the present invention is to provide a read-out apparatus of a solid state imaging device and an image scanner using the read-out apparatus for shortening the read-out time.

According to the present invention, the above mentioned purpose can be accomplished by a read-out apparatus for a solid state imaging device having a plurality of photoelectric converter elements which convert image into photoelectric charges and store the photoelectric charges, respectively. The apparatus includes a shift register means for shifting charges, transferred from the photoelectric converter elements, in sequence to output image signals which correspond to the photoelectric converter elements, respectively, a gate means for transferring the charge stored in the respective photoelectric converter elements to the shift register means each time a transfer signal is applied thereto, and a transfer signal generation means for generating the transfer signal when an image signal corresponding to a predetermined one of the photoelectric converter elements is outputted so that charges in the shift register means transferred from the photoelectric converter elements are partially overlapped with charges transferred in previous transfer operation.

Light entered into the solid state imaging device is stored in the photoelectric converter elements as photoelectric charges. The stored photoelectric charges are transferred and then read out in succession. When a photoelectric charge corresponding to a predetermined photoelectric converter element is read out in one scanning cycle, the read-out operation of the subsequent scanning cycle is started while the current scanning cycle is continued. Thus, charges of the photoelectric converter elements which are not used for picking-up an original image in a scanning cycle and charges of the photoelectric converter elements which are used for picking-up the original image in the subsequent scanning cycle can be read out simultaneously. Thus, the read-out time for the simultaneous read-out operation can be reduced. Consequently, the read-out speed of the solid state imaging device can be remarkably increased with the simple composition.

It is preferable that the shift register means shifts the transferred charges at a constant speed.

It is preferable that the read-out apparatus further includes a clock pulse generation means for generating clock pulses used for shifting the transferred charges in the shift register means.

It is preferable that the clock pulse generation means generates clock pulses with a constant frequency so that the shift register means shifts the transferred charges at a constant speed.

It is preferable that the clock pulse generation means has a pulse generator for generating clock pulses and a counter for counting the clock pulses from the pulse generator to produce a frequency-divided pulses.

It is preferable that the transfer signal generation means has a pulse generator for generating clock pulses and a counter for counting the clock pulses from the pulse generator to produce a carry output when the counter counts a predetermined number of the clock pulses.

It is preferable that the transfer signal generation means further includes a flip-flop circuit for generating pulses having a predetermined pulse width in response to the carry output from the counter.

The shift register means may shift the transferred charges at two different constant speeds.

The clock pulse generation means may generate two kinds of clock pulses with different constant frequencies, respectively, so that the shift register means shifts the transferred charges at two different constant speeds.

The clock pulse generation means includes a pulse generator for generating two kind of clock pulses with different constant frequencies and a counter for selectively counting one of the two kinds of clock pulses from the pulse generator to produce a frequency-divided pulses.

It is preferable that the clock pulse generation means includes a circuit for applying pulses having higher frequency to the counter when the image signals corresponding to the charges overlapped with charges transferred in previous transfer operation are outputted, and for applying pulses having lower frequency to the counter when the image signals corresponding to the charges not overlapped with charges transferred in previous transfer operation are outputted.

According to the present invention, the purpose can be accomplished by an image scanner including: a solid state imaging device having a plurality of photoelectric converter elements which convert image into photoelectric charges and store the photoelectric charges, respectively, a shift register means for shifting charges transferred from the photoelectric converter elements in sequence to output image signals which correspond to the photoelectric converter elements, respectively, and a gate means for transferring the charge stored in the respective photoelectric converter elements to the shift register means each time a transfer signal is applied thereto; and a transfer signal generation means for generating the transfer signal when an image signal corresponding to a predetermined one of the photoelectric converter elements is outputted so that charges in the shift register means transferred from the photoelectric converter elements are partially overlapped with charges transferred in previous transfer operation.

Further objects and advantages of the present invention will be apparent from the following description of the preferred embodiments of the invention as illustrated in the accompanying drawings.

DESCRIPTION OF THE PREFERRED EMBODIMENTS

Figure 1:
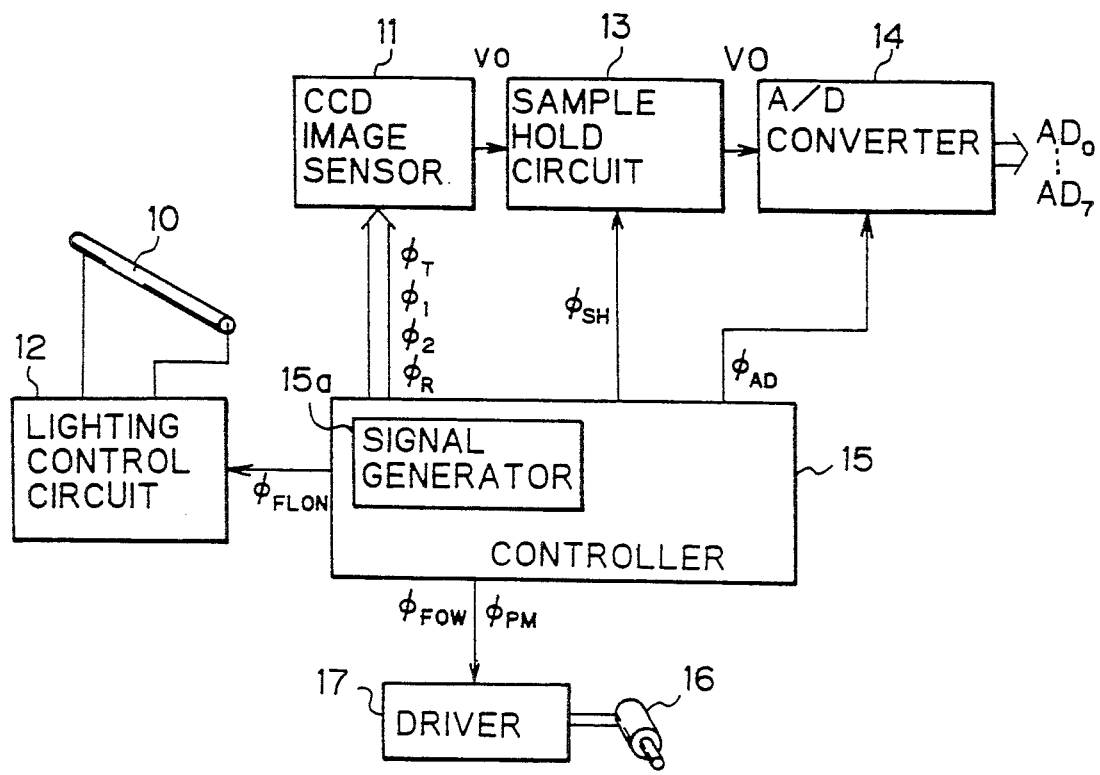
FIG. 1 shows a schematic construction of an image scanner of a preferred embodiment in accordance with the present invention.

FIG. 1 is a schematic showing the construction of an image scanner of a preferred embodiment in accordance with the present invention. In the image scanner, an image of an original illuminated by a light source of a fluorescent lamp 10 is picked-up by a CCD image sensor 11. The CCD image sensor 11 is a CCD linear image sensor in which a large number of sensor elements are aligned. In the present embodiment, an image which can be satisfactorily picked-up by a CCD image sensor with 3400 elements is picked-up by using the CCD image sensor 11 with 5000 elements. The horizontal scanning operation of the image scanner is electrically conducted by applying clock pulses to the CCD image sensor 11. In contrast, the vertical scanning operation of the image scanner is mechanically conducted by moving the original image.

As shown in FIG. 1, the fluorescent lamp 10 is connected to a lighting control circuit 12 for controlling turn on and turn off of the fluorescent lamp 10. An optical system is constituted so that the light from the fluorescent lamp 10 is applied to the original, and reflected light from the original is applied to the CCD image sensor 11. The output terminal of the CCD image sensor 11 is coupled with the input terminal of an A/D converter 14 through a sample hold circuit 13. The A/D converter 14 outputs an 8-bits digital image signal $AD_0-AD_7$.

The lighting control circuit 12, the CCD image sensor 11, the sample hold circuit 13, and the A/D converter 14 are connected to a controller 15 which is preferably formed by a microprocessor, and are controlled by pulse signals sent from the controller 15. The controller 15 is provided with a signal generator 15a for generating a part of these pulse signals. The controller 15 is also connected to a driver 17 of a pulse motor 16 for mechanically moving the original as the vertically scanning.

The lighting control circuit 12 turns on and off the fluorescent lamp 10 when a signal $\phi_{FLON}$ sent from the controller 15 is set to "1" and "0", respectively.

Figure 2:
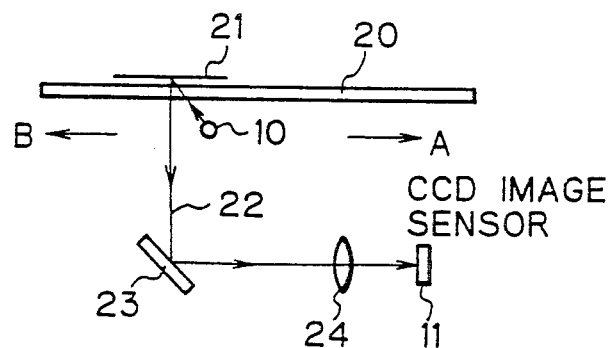
FIG. 2 shows a schematic construction of an optical system of the embodiment of FIG. 1.

FIG. 2 is a schematic showing the construction of the optical system of the embodiment shown in FIG. 1.

As shown in FIG. 2, a glass table 20 and the original 21 placed thereon are moved in the directions shown by arrows A and B by means of the pulse motor 16 shown in FIG. 1. Thus, the original 21 is vertically scanned. The light from the fluorescent lamp 10, which is extending in the horizontal scanning direction perpendicular to the vertically scanning direction, is applied to the original 21 through the glass table 20. The light 22 reflected by the original 21 enters on the light receiving surface of the CCD image sensor 11, through the glass table 20 again, a mirror 23, and a lens 24. As aforementioned, the CCD image sensor 11 is composed of a large number of sensor elements aligned in the horizontal scanning direction so as to receive the reflected light.

The driver 17 shown in FIG. 1 drives the pulse motor 16 in accordance with a direction control signal $\phi_{FOW}$ and a step feed signal $\phi_{PM}$ sent from the controller 15. When the direction control signal $\phi_{FOW}$ is set to "0", the glass table 20 moves in the direction of, for example, the arrow A in accordance with the number of pulses of the step feed signal $\phi_{PM}$. When the direction control signal $\phi_{FOW}$ is set to "1", the glass table 20 moves in the direction of the arrow B in accordance with the number of pulses of the step feed signal $\phi_{PM}$.

It is possible to move the glass table 20 by using a DC motor instead of the pulse motor. Although, in the present embodiment, the vertical scanning operation is conducted by moving the glass table 20 and also the original 21, it is possible to conduct the vertical scanning operation by mechanically moving the fluorescent lamp 10 and the optical system for guiding the light reflected from the original 21 to the CCD image sensor 11 instead of the glass table 20.

Figure 3:
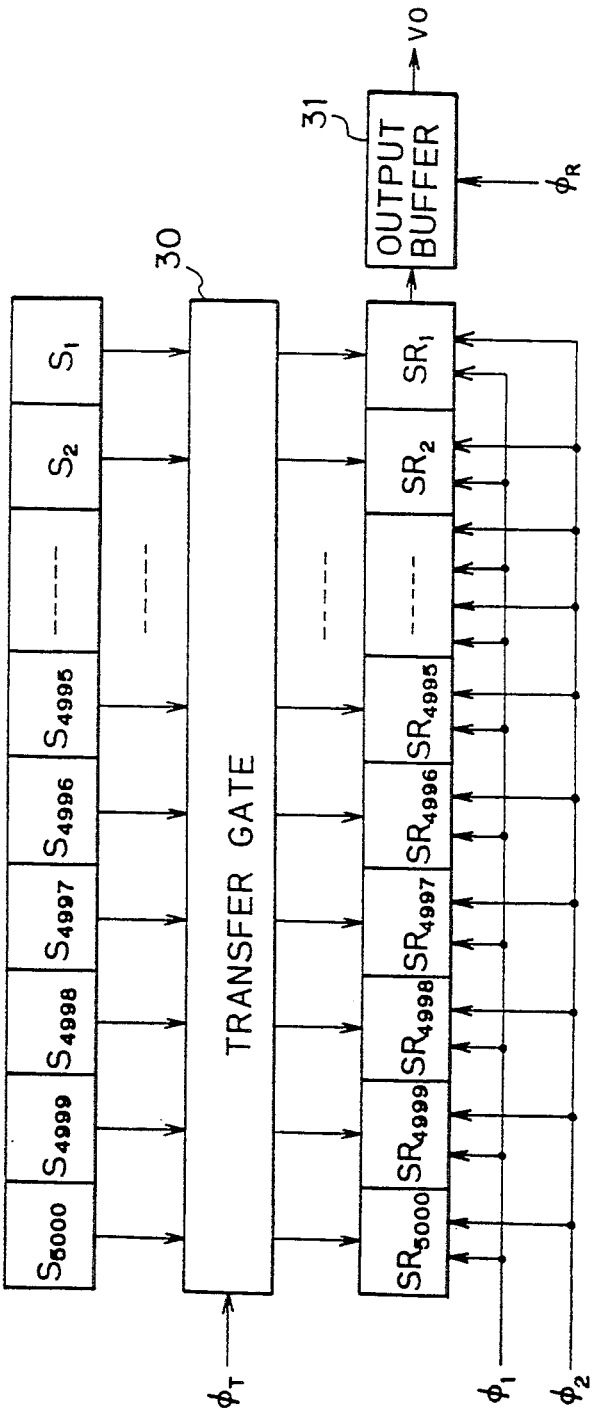
FIG. 3 shows a schematic electrical construction of the CCD image sensor of the embodiment of FIG. 1.

FIG. 3 is a schematic showing the electrical construction of the CCD image sensor 11 of the embodiment shown in FIG. 1. The CCD image sensor 11 is composed mainly of a large number of sensor elements, for example, 5000 elements $S_1-S_{5000}$, aligned in the horizontal scanning direction for conducting photoelectric conversion and for storing photoelectric charges obtained by the photoelectric conversion, and a large number of analog shift registers, for example, 5000 registers $SR_1$–$SR_{5000}$, connected to the respective sensor elements $S_1$–$S_{5000}$ through a transfer gate 30. An output terminal of the analog shift registers $SR_1$–$SR_{5000}$ is connected to an output buffer 31.

When a transfer pulse $\phi_T$ is sent from the controller 15 (FIG. 1) to the transfer gate 30, the photoelectric charges stored in the sensor elements $S_1$–$S_{5000}$ are simultaneously transferred to the analog shift registers $SR_1$–$SR_{5000}$, respectively. The charges transferred to the respective analog shift registers $SR_1$–$SR_{5000}$ are successively transferred to the output buffer 31 in synchronization with clock pulses $\phi_1$ and $\phi_2$ sent from the controller 15. The charges fed to the output buffer 31 are outputted as a CCD output voltage vo. Reset pulses $\phi_R$ are sent from the controller 15 to the output buffer 31 so as to reset the output buffer 31.

The CCD output voltage vo is applied to the sample hold circuit 13 wherein the applied CCD output voltage vo is sampled and compensated to produce an analog voltage VO.

Figure 4:
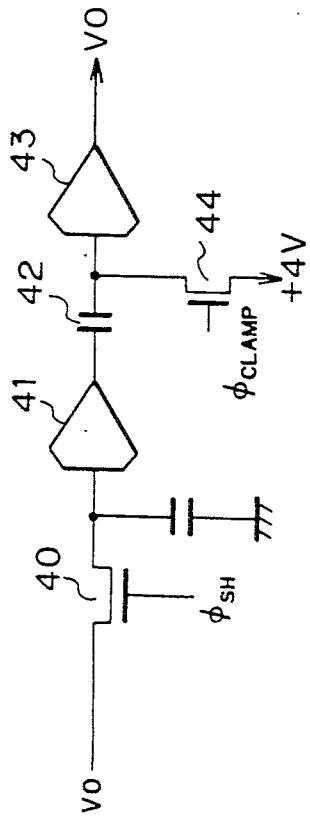
FIG. 4 shows a schematic construction of a sample hold circuit of the embodiment of FIG. 1.

FIG. 4 is a schematic showing the construction of the sample hold circuit 13. This sample hold circuit 13 serves to sample an image signal inputted thereto and to compensate the DC component of the sampled image signal.

In the circuit of FIG. 4, the inputted CCD output voltage vo is applied to an input terminal of a MOS (Metal Oxide Semiconductor) transistor 40, which is an example of an analog switch. To a gate of the MOS transistor 40, sample hold pulses $\phi_{SH}$ are applied. An output terminal of the MOS transistor 40 is connected to a clamping circuit through a voltage follower 41 and a capacitor 42. The clamping circuit includes a voltage follower 43 and a MOS transistor 44. To a terminal of this MOS transistor 44 a DC voltage, for example, +4 V, is applied. To a gate of the MOS transistor 44, clamping pulses $\phi_{CLAMP}$ are applied. Generally, since the CCD image sensor is DC coupled with the subsequent circuit, the DC component of the image signal (which is mainly the background portion of the image) is lost. Therefore, it is necessary to add the DC component being lost after the image signal is amplified to a required level. The addition of the DC component being lost, namely the compensation of the DC level, is conducted by the clamping circuit. The analog voltage VO where the DC level has been compensated is outputted from the voltage follower 43.

The above analog switch may be formed by using bipolar transistors or diodes instead of the MOS transistors 40 and 44.

The analog voltage VO from the sample hold circuit 13 is applied to an A/D converter 14. In the A/D converter 14, the analog voltage VO is converted into an 8-bits digital image signal $AD_0$–$AD_7$ in accordance with an A/D conversion pulse $\phi_{AD}$. The A/D converter 14 converts an analog signal voltage, for example, of +2 V to +4 V, into a 8-bits (256 level) digital signal. Thus, when the CCD output voltage vo sent from the CCD image sensor 11 is +4 V (in a black level, namely, a voltage level where light is not applied), each bit of the output signal $AD_0$–$AD_7$ sent from the A/D converter 14 becomes "0". In contrast, when the CCD output voltage vo is +2 V (in a white level, namely saturated voltage level where light is applied), each bit of the output signal $AD_0$–$AD_7$ sent from the A/D converter becomes "1".

Figure 5:
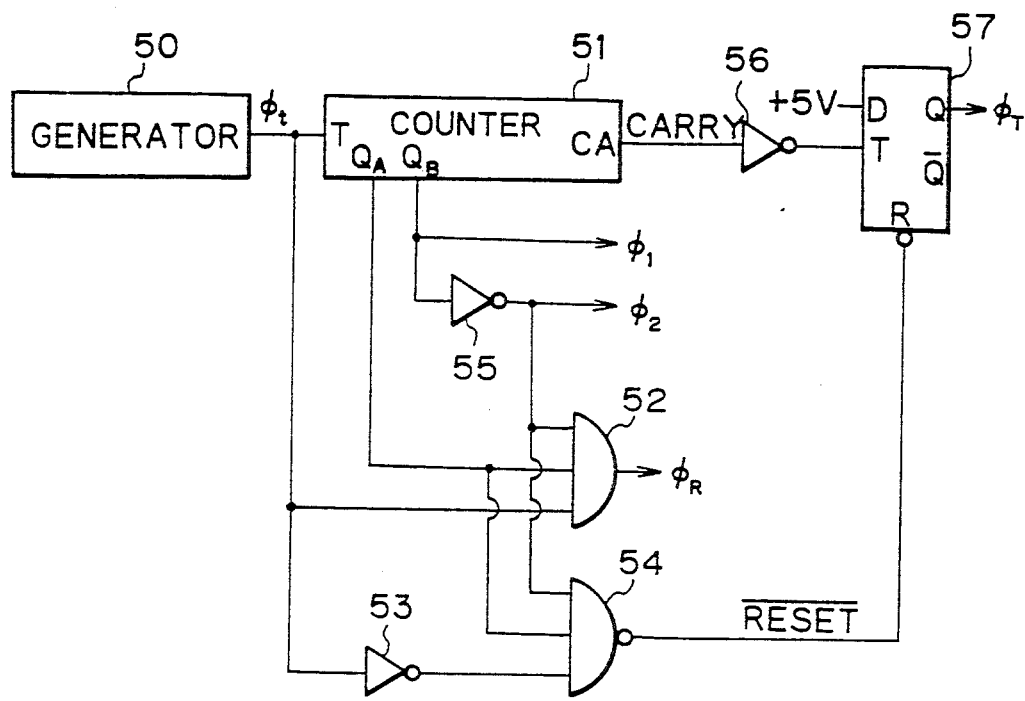
FIG. 5 shows a schematic circuit construction of a signal generator included in a controller of FIG. 1.

FIG. 5 is a schematic showing the circuit construction of a signal generator 15a of the controller 15 shown in FIG. 1. The signal generator 15a is a circuit for generating part of pulse signals such as the transfer pulses $\phi_T$, the clock pulses $\phi_1$ and $\phi_2$, and the reset pulses $\phi_R$.

As shown in FIG. 5, the signal generator 15a is provided with a generator 50 for generating basic clock pulses $\phi_t$ whose frequency is for example 2 MHz. Although the generator 50 uses a crystal oscillator, it is possible to construct the generator 50 by using a PLL (Phased Locked Loop) circuit or the like. An output terminal of the generator 50 is connected to a pulse input terminal T of a counter 51, an input terminal of a three-inputs AND gate 52, and, through an inverter 53, an input terminal of a three-inputs NAND gate 54. An output terminal $Q_A$ of the counter 51 is connected to an input terminal of the AND gate 52 and an input terminal of the NAND gate 54. An output terminal $Q_B$ of the counter 51 is connected to an input terminal of the inverter 55. An output signal of the output terminal $Q_B$ is used as the clock pulses $\phi_1$. The clock pulses $\phi_1$ are inverted by the inverter 55 and then used as the clock pulses $\phi_2$. An output terminal of the inverter 55 is connected to an input terminal of the AND gate 52 and an input terminal of the NAND gate 54. A carry output terminal CA of the counter 51 is connected to a clock input terminal T of a D flip-flop 57 through an inverter 56.

Signals outputted from an output terminal of the AND gate 52 are the reset pulses $\phi_R$. Signals outputted from an output terminal of the NAND gate 54 called as $\overline{RESET}$ (bar) signals are applied to a reset input terminal R of the D flip-flop 57. An input terminal D of the flip-flop 57 is pulled up to +5 V. Signals outputted from an output terminal Q of the flip-flop 57 are the transfer pulses $\phi_T$.

Figure 6:
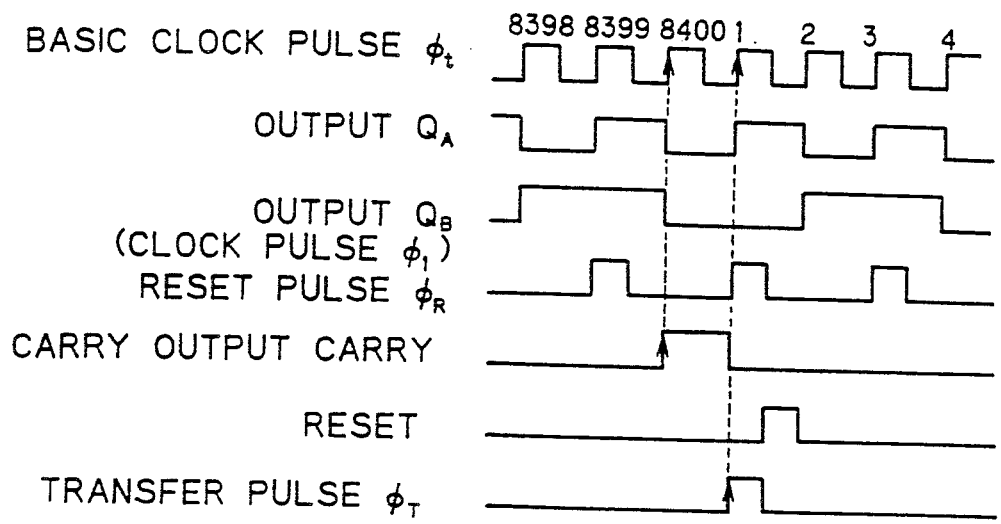
FIG. 6 shows a timing chart of each signal of the circuit of FIG. 5.

FIG. 6 is a timing chart of each signal of the circuit shown in FIG. 5. The basic clock pulses $\phi_t$ whose frequency is 2 MHz are generated by the generator 50 and sent to the counter 51. Thus, 1 MHz output signal $Q_A$ obtained by dividing the frequency of the basic clock pulses into ½ is produced from the output terminal $Q_A$ of the counter 51, and 500 KHz output signal $Q_B$ obtained by dividing the frequency of the basic clock pulses into ¼ is produced from the output terminal $Q_B$. The output signal $Q_B$ is used as the clock pulses $\phi_1$. The clock pulses $\phi_2$ are obtained by inverting the clock pulses $\phi_1$.

The basic clock pulses $\phi_t$ from the generator 50, the clock pulses $\phi_2$, and the output signal $Q_A$ of the counter 51 are anded by the AND gate 52 and thereby the reset pulses $\phi_R$ are obtained. In addition, the pulses obtained by inverting the basic clock pulses $\phi_t$ from the generator 50, the clock pulses $\phi_2$, and the output signal $Q_A$ of the counter 51 are inversely anded by the NAND gate 54 and thereby the pulses $\overline{RESET}$ (bar) are obtained. In FIG. 6, the pulses $\overline{RESET}$ (bar) are indicated by non-inverted pulses RESET.

When the counter 51 counts 8400 times the basic clock pulses $\phi_t$ applied to the input terminal T, one carry output signal CARRY is generated in synchronization with the rising edge of the 8400th pulse $\phi_t$. The carry output signal CARRY is applied to the clock input terminal T of the D flip-flop 57 through the inverter 56. Thus, when the level of the carry output signal CARRY falls, the transfer pulse $\phi_T$ is outputted from the output terminal Q of the D flip-flop 57. The pulses $\overline{RESET}$ (bar) cause the transfer pulse $\phi_T$ to fall.

Figure 7:
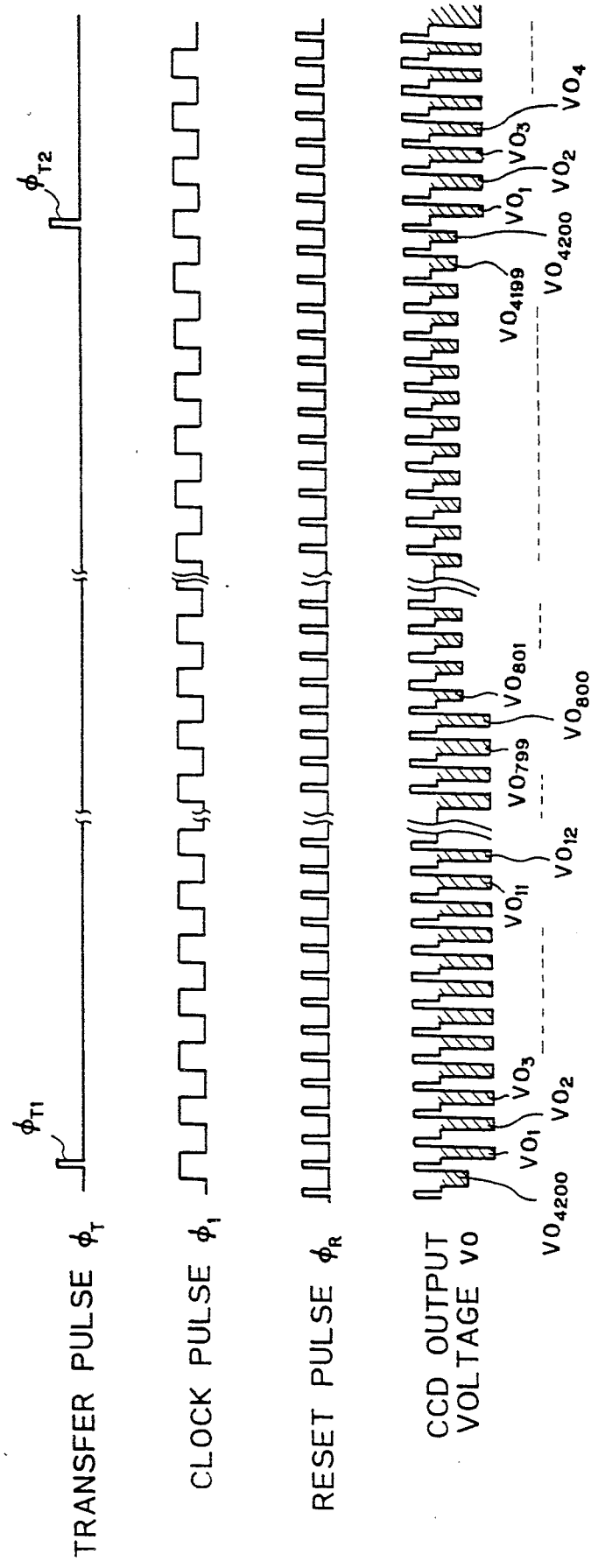
FIG. 7 shows a timing chart of each signal describing how a CCD output voltage is controlled in the embodiment of FIG. 1.

FIG. 7 is a timing chart of each signal describing how CCD output voltage vo from the CCD image sensor is controlled by the aforementioned transfer pulses $\phi_T$, the clock pulses $\phi_1$ and $\phi_2$, and the reset pulses $\phi_R$.

When the transfer pulses $\phi_T$ are sent from the signal generator 15a (see FIG. 1) to the transfer gate 30 of the CCD image sensor 11 (see FIG. 3), the photoelectric charges stored in the 5000 sensor elements $S_1$–$S_{5000}$ are transferred to the 5000 analog shift registers $SR_1$–$SR_{5000}$ in accordance with a first transfer pulse $\phi_{T1}$. Thus, the charges are read out and thereby the CCD output voltages $v_{O1}$–$v_{O5000}$ sent from the 5000 sensor elements $S_1$–$S_{5000}$ are outputted successively to the output buffer 31 in synchronization with the clock pulses $\phi_1$ and $\phi_2$. Each of the CCD output voltages $v_{O1}$–$v_{O5000}$ outputted to the output buffer 31 is reset every time the reset pulse $\phi_R$ is applied.

When the 8400th basic clock pulse $\phi_t$ sent from the generator 50, namely the 2100th clock pulse $\phi_1$ (which is equivalent to the 4200th clock pulse where the clock pulses $\phi_1$ and $\phi_2$ are added), is applied to the CCD image sensor 11, a second transfer pulse $\phi_{T2}$ is applied to the transfer gate 30 of the CCD image sensor 11. Thus, the charge stored in the sensor element $S_{4201}$ of the CCD image sensor 11 is added to the charge stored, after the previous charge-transferring operation, in the sensor element $S_1$. The result of this addition is outputted as the CCD output voltage $v_{O1}$. Accordingly, as shown in FIG. 7, the voltages corresponding to the sum of the charges stored in the sensor elements $S_{4201}$–$S_{5000}$ and the charges stored in the sensor elements $S_1$–$S_{800}$ in the subsequent cycle, respectively, are outputted from the output buffer 31 as the CCD output voltages $v_{O1}$–$v_{O800}$. As described above, in the present embodiment, since the original image capable of being picked-up by using the CCD image sensor with 3400 elements is picked-up by the CCD image sensor 11 with 5000 elements, the 1st to 800th sensor elements and the 4201st to 5000th sensor elements are not used for picking-up the original image. Only the 801st to 4200th sensor elements are used for picking-up the original image. Thus, by controlling the circuit in the aforementioned manner, only the CCD output voltages $v_{O801}$–$v_{O4200}$ from the CCD image sensor 11 are used as the image signal.

The obtained CCD output voltages $v_{O801}$–$v_{O4200}$ are sampled by the sample hold pulses $\phi_{SH}$ and compensated in the DC level by the clamping pulses $\phi_{CLAMP}$ in the sample hold circuit 13. The resultant signals are sent to the A/D converter 14 and then converted into digital signals in synchronization with the AD pulses $\phi_{AD}$.

According to the present embodiment, if the frequency of the basic clock pulses $\phi_t$ is 2 MHz, one scanning cycle becomes 4.2 msec and thereby the scanning time of the present embodiment becomes shorter than that of the related art by 0.8 msec.

In addition, by changing the counting times of the counter 51 from 4800 to 4400 so as to shorten the period of the transfer pulse, the 801st to 4200th output voltages $v_{O801}$–$v_{O4200}$ can be continuously outputted.

Figure 8:
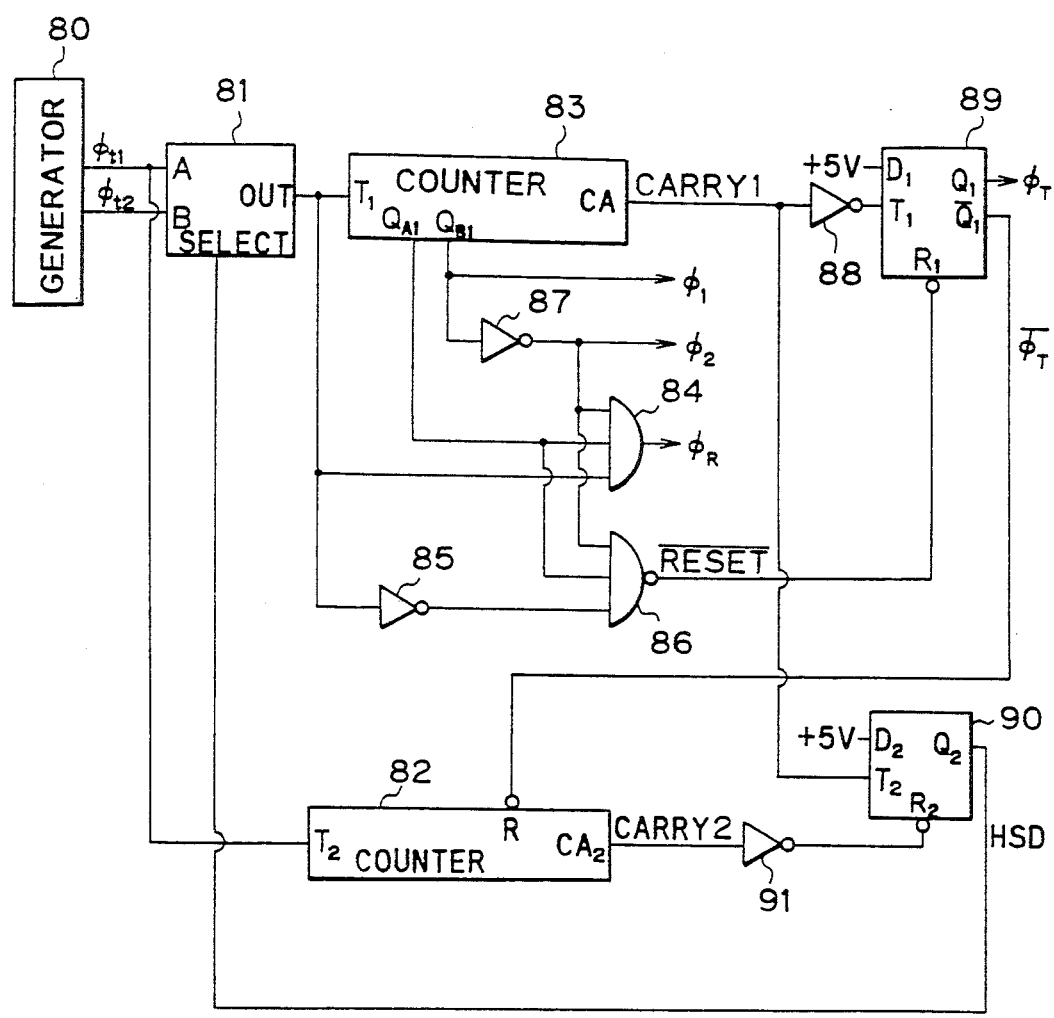
FIG. 8 shows a schematic circuit construction of a signal generator of another embodiment in accordance with the present invention.

FIG. 8 is a schematic showing the circuit construction of a signal generator of another embodiment in accordance with the present invention. The overall construction of this embodiment is the same as that shown in FIG. 1. The difference between this embodiment and that shown in FIG. 1 is that the read-out pulse period of the charges stored in the sensor elements $S_1$–$S_{800}$, which are not used for the image picking-up operation of the CCD image sensor 11, is half the read-out pulse period of the sensor elements $S_{801}$–$S_{4200}$, which are used for the image picking-up operation thereof, namely 2 MHz.

As shown in FIG. 8, a signal generator used in this embodiment is provided with a generator 80 for outputting two basic clock pulses $\phi_{t1}$ and $\phi_{t2}$ with two different frequencies, for example, 4 MHz and 2 MHz, respectively. The generator 80 may use two different crystal oscillators for generating such different frequency pulses or use different PLLs for that. Of course, it is possible to multiply the frequency of the pulses from one crystal oscillator.

Two output terminals of the generator 80 are connected to input terminals A and B of a data selector 81, respectively. The data selector 81 is constructed as follows. When a HSD signal (high speed signal) applied to a control input terminal SELECT is set to "1", the input terminal A is connected to an output terminal OUT and thereby the basic clock pulses $\phi_{t1}$ are outputted. On the other hand, when the HSD signal is set to "0", the input terminal B is connected to the output terminal OUT and thereby the basic clock pulses $\phi_{t2}$ are outputted.

An output terminal for the basic clock pulses $\phi_{t1}$ of the generator 80 is also connected to a pulse input terminal $T_2$ of a counter 82. An output terminal OUT of the data selector 81 is connected to a pulse input terminal $T_1$ of a counter 83, an input terminal of a three-inputs AND gate 84, and, through an inverter 85, an input terminal of a three-inputs NAND gate 86. An output terminal $Q_{A1}$ of the counter 83 is connected to an input terminal of the AND gate 84 and an input terminal of the NAND gate 86. An output terminal $Q_{B1}$ of the counter 83 is connected to an input terminal of an inverter 87. An output signal of the output terminal $Q_{B1}$ is used as clock pulses $\phi_1$. The clock pulses $\phi_1$ are inverted by the inverter 87 to be used as the clock pulses $\phi_2$. An output terminal of the inverter 87 is connected to an input terminal of the AND gate 84 and an input terminal of the NAND gate 86. An carry output terminal $CA_1$ of the counter 83 is connected to a clock input terminal $T_1$ of a D flip-flop 89 through an inverter 88. The carry output terminal $CA_1$ is also connected to a clock input terminal $T_2$ of a D flip-flop 90.

Signals outputted from an output terminal of the AND gate 84 are used as reset pulses $\phi_R$. Signals outputted from an output terminal of the NAND gate 86 called as $\overline{RESET}$ (bar) signals are applied to a reset input terminal $R_1$ of the D flip-flop 89. An input terminal $D_1$ of the flip-flop 89 is pulled up to +5 V. Signals outputted from an output terminal $Q_1$ of the flip-flop 89 are used as transfer pulses $\phi_T$.

A carry output terminal $CA_2$ of the counter 82 is connected to a reset input terminal $R_2$ of the D flip-flop 90 through an inverter 91. To a reset input terminal R of the counter 82, an inverted transfer pulse $\overline{\phi_T}$ outputted from an inverted output terminal $\overline{Q_1}$ of the D flip-flop 89 is applied. An input terminal $D_2$ of the D flip-flop 90 is pulled up to +5 V. The HSD signal is outputted from an output terminal $Q_2$ of the D flip-flop 90.

Figure 9:
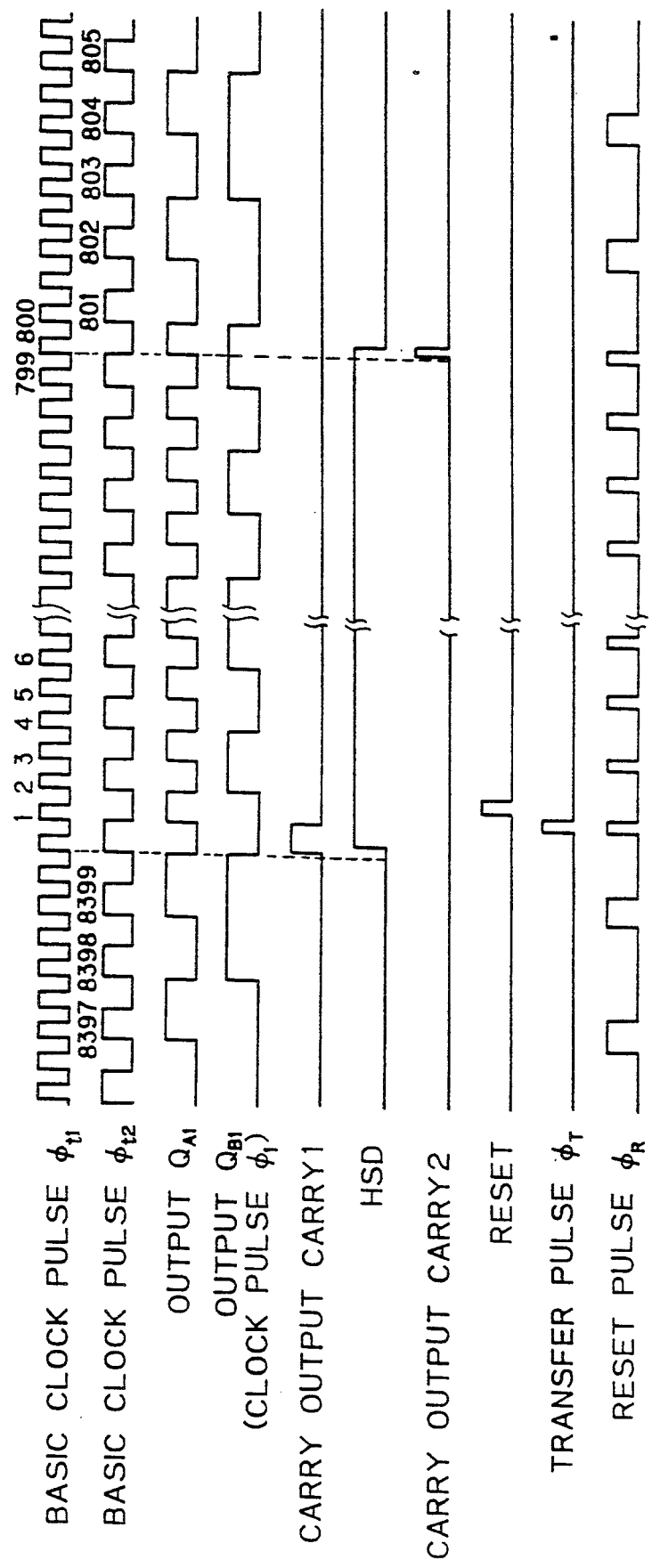
FIG. 9 shows a timing chart of each signal of the circuit of FIG. 8.

FIG. 9 is a timing chart of each signal of the circuit shown in FIG. 8. The 4 MHz basic clock pulses $\phi_{t1}$ and the 2 MHz clock pulses $\phi_{t2}$ are outputted from the generator 80 to the input terminals A and B of the data selector 81, respectively.

When the HSD signal is set to "0", the data selector 81 outputs the 2 MHz basic clock pulses $\phi_{t2}$. Thus, 1 MHz output signal $Q_{A1}$ obtained by dividing the frequency of the 2 MHz basic clock pulses $\phi_{t2}$ into $\frac{1}{2}$ is produced from the output terminal $Q_{A1}$ of the counter 83, and 500 KHz output signal $Q_{B2}$ obtained by dividing the frequency of the 2 MHz basic clock pulses $\phi_{t2}$ into $\frac{1}{4}$ is produced from the output terminal $Q_{B2}$ of the counter 83. The output signal $Q_{B2}$ is outputted as clock pulses $\phi_1$. The clock pulses $\phi_2$ are pulses obtained by inverting the clock pulses $\phi_1$.

The basic clock pulses $\phi_{t2}$, the clock pulses $\phi_2$, and the output signal $Q_{A1}$ of the counter 83 are anded by the AND gate 84 and thereby reset pulses $\phi_R$ are obtained. In addition, the pulses obtained by inverting the basic clock pulses $\phi_{t2}$, the clock pulses $\phi_2$, and the output signal $Q_{A1}$ of the counter 83 are inversely anded by the NAND gate 86 and thereby pulses $\overline{RESET}$ (bar) are produced. In FIG. 9, the pulses $\overline{RESET}$ (bar) are indicated by non-inverted pulses RESET.

When the counter 83 counts 8400 times the basic clock pulses $\phi_{t2}$ applied to the input terminal $T_1$, one carry output signal CARRY1 is generated in synchronization with the rising edge of the 8400th pulse. The carry output signal CARRY1 is applied to the clock input terminal $T_1$ of the D flip-flop 89 through the inverter 88. Thus, when the level of the carry output signal CARRY1 falls, the transfer pulse $\phi_T$ is outputted from the output terminal $Q_1$ of the D flip-flop 89. The pulses $\overline{RESET}$ (bar) cause the transfer pulse $\phi_T$ to fall. The carry output signal CARRY1 is also applied to the clock input terminal $T_2$ of the other D flip-flop 90 and thereby the level of the HSD signal, which is the output signal of the output terminal $Q_2$, changes from "0" to "1". Thus, the data selector 81 is switched so that the 4 MHz basic clock pulse $\phi_{t1}$ is outputted.

To the input terminal $T_2$ of the counter 82, the basic clock pulses $\phi_{t1}$ are always applied. The pulses $\phi_T$(bar) obtained by inverting the transfer pulses $\phi_T$ are applied to the reset input terminal R of the counter 82 so as to cause the counter 82 to synchronize with the counter 83. When the inverted transfer pulse $\phi_T$(bar) is applied to the reset terminal R of the counter 82, the counter 82 is reset. When the basic clock pulses $\phi_{t1}$ are applied to the input terminal $T_2$ 799 times, the counter 82 generates one carry output signal CARRY2 in synchronization with the rising edge of the 799th pulse $\phi_{t1}$. The carry output signal CARRY2 is applied to the reset input terminal $R_2$ of the D flip-flop 90 through the inverter 91. Thus, the D flip-flop 90 is reset and thereby the level of the HSD signal from the output terminal $Q_2$ changes from "1" to "0". Consequently, the data selector 81 is switched so that the 2 MHz basic clock pulses $\phi_{t2}$ are outputted.

As described above, while the charges stored in the sensor elements $S_{801}$-$S_{4200}$ used for the image picking-up operation of the CCD image sensor 11 are read out, the 2 MHz basic clock pulses $\phi_{t2}$ are used. On the other hand, while the charges stored in the sensor elements $S_1$-$S_{800}$ and $S_{4201}$-$S_{5000}$, which are not used for the image picking-up operation, are read out, the data selector 81 is switched so as to use the 4 MHz basic clock pulses $\phi_{t1}$. Thus, the read-out period of the sensor elements $S_1$-$S_{800}$ and $S_{4201}$-$S_{5000}$, which are not used for the image picking-up operation, becomes half as the read-out period of the sensor elements $S_{801}$-$S_{4200}$, which are used for the image picking-up operation, thereby reducing the read-out time. Moreover, for the sensor elements $S_1$-$S_{800}$ and $S_{4201}$-$S_{5000}$, a read-out error thereof does not affect the image picking-up operation of the CCD image sensor 11. It is possible to use clock pulses whose frequency is higher than 2 MHz.

Figure 10:
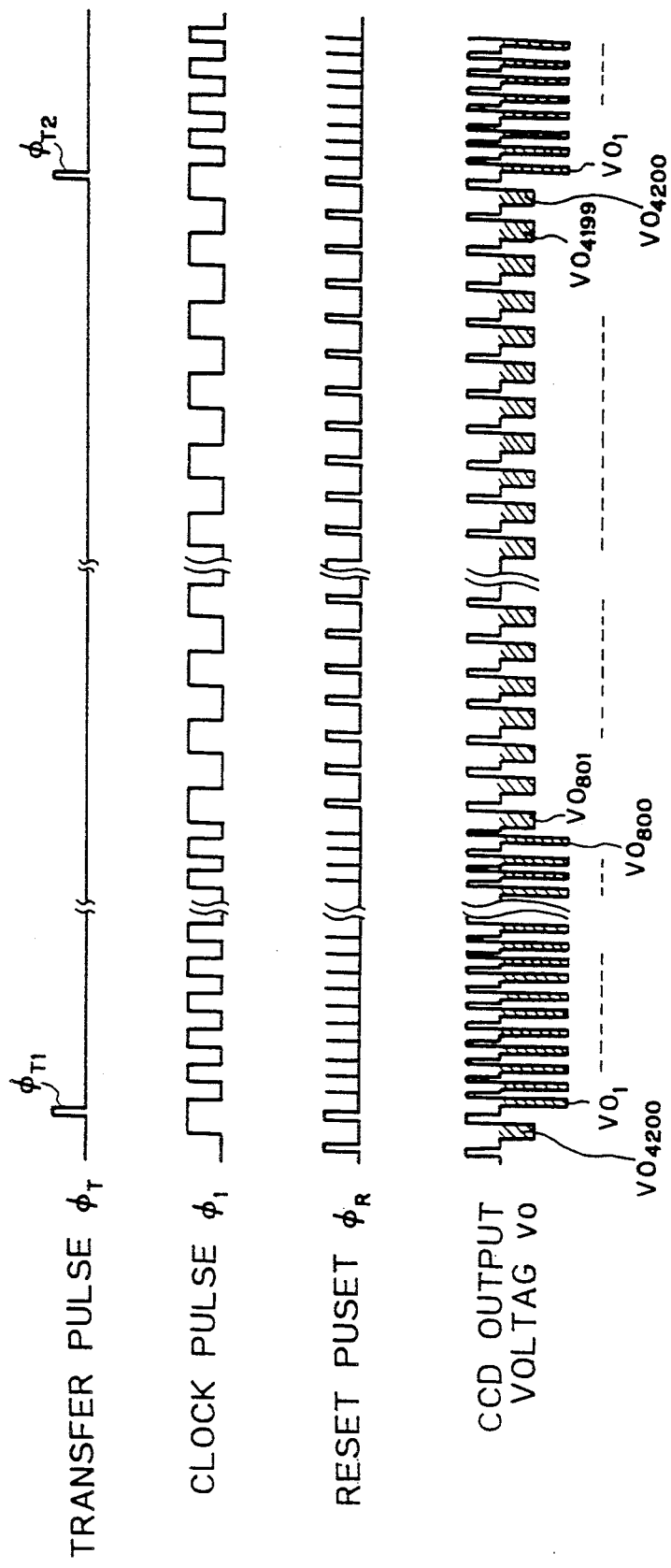
FIG. 10 shows a timing chart of each signal describing how a CCD output voltage is controlled in the embodiment of FIG. 8.

FIG. 10 is a timing chart of each signal describing how CCD output voltage vo is controlled by the aforementioned transfer pulses $\phi_T$, the clock pulses $\phi_1$ and $\phi_2$, and the reset pulses $\phi_R$.

When the transfer pulse $\phi_T$ is applied from the signal generator to the transfer gate 30 of the CCD image sensor 11 (see FIG. 3), the charges stored in the sensor elements $S_1$-$S_{5000}$ are transferred to the 5000 respective analog shift registers $SR_1$-$SR_{5000}$ in synchronization with a first transfer pulse $\phi_{T1}$. Thus, the charges are read out and then the CCD output voltages $v_{o1}$-$v_{o5000}$ are successively outputted from the 5000 sensor elements $S_1$-$S_{5000}$ to the output buffer 31. Each of the CCD output voltages $v_{o1}$-$v_{o5000}$ outputted to the output buffer 31 is reset every time the reset pulse $\phi_R$ is applied.

When the 8400th basic clock pulses $\phi_{t1}$ and $\phi_{t2}$, namely the 2100th clock pulse $\phi_1$ (which is equivalent to th 4200th clock pulse where the clock pulses $\phi_1$ and $\phi_2$ are added), are applied to the CCD image sensor 11, a second transfer pulse $\phi_{T2}$ is applied to the transfer gate 30 of the CCD image sensor 11. Therefore, the charges stored in the sensor element $S_{4201}$ of the CCD image sensor 11 is added to the charge stored, after the previous charge-transferring operation, in the sensor element $S_1$. The result of this addition is outputted as the CCD output voltage $v_{o1}$. Accordingly, as shown in FIG. 10, the voltages corresponding to the sum of the charges stored in the sensor elements $S_{4201}$-$S_{5000}$ and the charges stored in the sensor elements $S_1$-$S_{800}$ in the subsequent cycle, respectively, are outputted from the output buffer 30 as the CCD output voltages $v_{o1}$-$v_{o800}$.

During the read-out operation of the CCD output voltages $v_{o1}$-$v_{o800}$ which are not used for the image picking-up operation, the 4 MHz basic clock pulses $\phi_{t1}$ are used as described above. Thus, the read-out period of the voltages which are not used for the image picking-up operation becomes half as the read-out period of the voltages which are used for the image picking-up operation, thereby remarkably reducing the read-out time.

As described above, according to this embodiment, the charges of the 1st to 800th sensor elements of the CCD image sensor 11 and the charge of the 4201st to 5000 sensor elements are read out simultaneously at half the period of the read-out operation of sensor elements used for the image picking-up operation. Therefore, one period of the transfer pulses $\phi_T$ becomes 0.3 msec + 3.4 msec = 3.8 msec. Consequently, the read-out period can be reduced for approximately 1.2 msec in comparison with the related art.

In the aforementioned embodiments, the CCD image sensor with 5000 sensor elements was used. However, the present invention can be applied to other solid state imaging devices with different number of sensor elements. Moreover, the present invention can be applied to originals in other than the letter size.

Furthermore, even if the number of sensor elements required is not fixed, by changing the number of times of pulses generated by the counter, the present invention can be applied. In addition, the original image can be read out in a short time proportional to the number of sensor elements.

The read-out apparatus of the solid state imaging device according to the present invention can be applied to image forming apparatus such as a copy machine and facsimile machine as well as the image scanner.

Many widely different embodiments of the present invention may be constructed without departing from the spirit and scope of the present invention. It should be understood that the present invention is not limited to the specific embodiments described in the specification, except as defined in the appended claims.

What is claimed is:

1. A read-out apparatus for a solid state imaging device having a plurality of photoelectric converter elements which convert image into photoelectric charges and store the photoelectric charges, respectively, the apparatus comprising:

a shift register means for shifting charges, transferred from the photoelectric converter elements, in sequence to output image signals which correspond to said photoelectric converter elements, respectively;

a gate means for transferring the charge stored in said respective photoelectric converter elements to said shift register means each time a transfer signal is applied thereto; and a transfer signal generation means for generating the transfer signal when an image signal corresponding to a predetermined one of said photoelectric converter elements is outputted so that charges in said shift register means transferred from said photoelectric converter elements are partially overlapped with charges transferred in previous transfer operation.

2. A read-out apparatus as claimed in claim 1, wherein said shift register means shifts the transferred charges at a constant speed.

3. A read-out apparatus as claimed in claim 1, wherein said read-out apparatus further comprises a clock pulse generation means for generating clock pulses used for shifting the transferred charges in said shift register means.

4. A read-out apparatus as claimed in claim 3, wherein said clock pulse generation means generates clock pulses with a constant frequency so that said shift register means shifts the transferred charges at a constant speed.

5. A read-out apparatus as claimed in claim 3, wherein said clock pulse generation means comprises a pulse generator for generating clock pulses and a counter for counting the clock pulses from said pulse generator to produce frequency-divided pulses.

6. A read-out apparatus as claimed in claim 1, wherein said transfer signal generation means comprises a pulse generator for generating clock pulses and a counter for counting the clock pulses from said pulse generator to produce a carry output when the counter counts a predetermined number of the clock pulses.

7. A read-out apparatus as claimed in claim 6, wherein said transfer signal generation means further comprises a flip-flop circuit for generating pulses having a predetermined pulse width in response to the carry output from said counter.

8. A read-out apparatus as claimed in claim 1, wherein said shift register means shifts the transferred charges at two different constant speeds.

9. A read-out apparatus as claimed in claim 3, wherein said clock pulse generation means generates two kinds of clock pulses with different constant frequencies, respectively, so that said shift register means shifts the transferred charges at two different constant speeds.

10. A read-out apparatus as claimed in claim 3, wherein said clock pulse generation means comprises a pulse generator for generating two kind of clock pulses with different constant frequencies and a counter for selectively counting one of the two kinds of clock pulses from said pulse generator to produce frequency-divided pulses.

11. A read-out apparatus as claimed in claim 10, wherein said clock pulse generation means comprises a circuit for applying pulses having higher frequency to said counter when the image signals corresponding to the charges overlapped with charges transferred in previous transfer operation are outputted, and for applying pulses having lower frequency to said counter when the image signals corresponding to the charges not overlapped with charges transferred in previous transfer operation are outputted.

12. An image scanner comprising:

a solid state imaging device having a plurality of photoelectric converter elements which convert image into photoelectric charges and store the photoelectric charges, respectively, a shift register means for shifting charges, transferred from said photoelectric converter elements, in sequence to output image signals which correspond to said photoelectric converter elements, respectively, and a gate means for transferring the charge stored in said respective photoelectric converter elements to said shift register means each time a transfer signal is applied thereto; and a transfer signal generation means for generating the transfer signal when an image signal corresponding to a predetermined one of said photoelectric converter elements is outputted so that charges in said shift register means transferred from said photoelectric converter elements are partially overlapped with charges transferred in previous transfer operation.

13. An image scanner as claimed in claim 12, wherein said shift register means shifts the transferred charges at a constant speed.

14. An image scanner as claimed in claim 12, wherein said read-out apparatus further comprises a clock pulse generation means for generating clock pulses used for shifting the transferred charges in said shift register means.

15. An image scanner as claimed in claim 14, wherein said clock pulse generation means generates clock pulses with a constant frequency so that said shift register means shifts the transferred charges at a constant speed.

16. An image scanner as claimed in claim 14, wherein said clock pulse generation means comprises a pulse generator for generating clock pulses and a counter for counting the clock pulses from said pulse generator to produce frequency-divided pulses.

17. An image scanner as claimed in claim 12, wherein said transfer signal generation means comprises a pulse generator for generating clock pulses and a counter for counting the clock pulses from said pulse generator to produce a carry output when the counter counts a predetermined number of the clock pulses.

18. An image scanner as claimed in claim 17, wherein said transfer signal generation means further comprises a flip-flop circuit for generating pulses having a predetermined pulse width in response to the carry output from said counter.

19. An image scanner as claimed in claim 12, wherein said shift register means shifts the transferred charges at two different constant speeds.

20. An image scanner as claimed in claim 14, wherein said clock pulse generation means generates two kinds of clock pulses with different constant frequencies, respectively, so that said shift register means shifts the transferred charges at two different constant speeds.

21. An image scanner as claimed in claim 14, wherein said clock pulse generation means comprises a pulse generator for generating two kind of clock pulses with different constant frequencies and a counter for selectively counting one of the two kinds of clock pulses from said pulse generator to produce frequency-divided pulses.

22. An image scanner as claimed in claim 21, wherein said clock pulse generation means comprises a circuit for applying pulses having higher frequency to said counter when the image signals corresponding to the charges overlapped with charges transferred in previous transfer operation are outputted, and for applying pulses having lower frequency to said counter when the image signals corresponding to the charges not overlapped with charges transferred in previous transfer operation are outputted.

23. An image scanner comprising:
  a solid state scanning device having a plurality of photoelectric converter elements for storing photoelectric charges and a shift register means for transferring the photoelectric charges stored in said photoelectric converter elements in accordance with a transfer pulse;
  a scanning means for successively sending and reading out the charges transferred to said shift register means of said solid state imaging device; and
  means for applying the transfer pulse to said solid state imaging device so as to start the read-out operation in the subsequent scanning cycle simultaneously when a photoelectric charge is read out from a predetermined photoelectric converter element in the current scanning cycle.

* * * * *